United States Patent
Hamahata et al.

(10) Patent No.: US 7,264,642 B2
(45) Date of Patent: Sep. 4, 2007

(54) EXHAUST GAS CLEANING APPARATUS

(75) Inventors: Toshihiro Hamahata, Saitama (JP); Shoko Tanida, Higashimatsuyama (JP); Toru Hasegawa, Higashimatsuyama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 358 days.

(21) Appl. No.: 10/492,025

(22) PCT Filed: Aug. 8, 2003

(86) PCT No.: PCT/JP03/10129

§ 371 (c)(1),
(2), (4) Date: Apr. 8, 2004

(87) PCT Pub. No.: WO2004/016915

PCT Pub. Date: Feb. 26, 2004

(65) Prior Publication Data

US 2004/0211159 A1    Oct. 28, 2004

(30) Foreign Application Priority Data

Aug. 12, 2002   (JP)   .............................. 2002-234582

(51) Int. Cl.
*B01D 46/00*   (2006.01)
(52) U.S. Cl. ....................... 55/282.3; 55/282.2; 55/283; 55/385.3; 55/523; 55/DIG. 10; 55/DIG. 30; 96/417; 96/418; 96/419; 96/420; 96/421; 60/311

(58) Field of Classification Search ............... 55/282.2, 55/282.3, 283, 385.3, 523, DIG. 10, DIG. 30; 96/417, 418, 419, 420, 421; 95/14, 15, 18, 95/19, 273, 278; 60/273, 274, 286, 295, 60/297, 311
See application file for complete search history.

(56) References Cited

U.S. PATENT DOCUMENTS 4,803,838 A * 2/1989 Kaeser ..................... 60/288

(Continued)

FOREIGN PATENT DOCUMENTS

JP            59-20515         2/1984

(Continued)

*Primary Examiner*—Jason M. Greene
(74) *Attorney, Agent, or Firm*—Connolly Bove Lodge and Hutz

(57) ABSTRACT

In an exhaust gas cleaning apparatus (30) in which a before and after differential pressure ($\Delta P$) of a filter (32) used to trap particulates is detected for regeneration of the filter (32), a time at which, during filter regeneration, the temperature of the outlet section of the filter (32) falls below the temperature of the inlet section thereof ($\Delta T > M$), using a first temperature sensor (36) and a second temperature sensor (37), is determined as being the timing of the completion of the regeneration of the filter (32). The value of the before and after differential pressure ($\Delta P$) at the time of this regeneration completion is used to estimate the quantity of residual ash in the filter (32), and when this estimated residual ash quantity is the same as, or greater than, a prescribed value (PX), a replacement warning signal (K3) is output urging replacement of the filter (32).

7 Claims, 4 Drawing Sheets

U.S. PATENT DOCUMENTS

| | | | |
|---|---|---|---|
| 5,287,698 A * | 2/1994 | Shinzawa et al. | 60/286 |
| 6,405,528 B1 * | 6/2002 | Christen et al. | 60/311 |
| 6,622,480 B2 * | 9/2003 | Tashiro et al. | 60/311 |
| 6,829,890 B2 * | 12/2004 | Gui et al. | 60/311 |
| 2002/0033017 A1 * | 3/2002 | Bruggemann et al. | 60/295 |
| 2005/0150221 A1 * | 7/2005 | Crawley et al. | 60/295 |

FOREIGN PATENT DOCUMENTS

| | | | |
|---|---|---|---|
| JP | 62-7912 | * | 1/1987 |
| JP | 7-11935 | | 1/1995 |
| JP | 7-119443 | | 5/1995 |
| JP | 11-280449 | | 10/1999 |
| JP | 2001-280122 | | 10/2001 |
| JP | 2003-83036 | * | 3/2003 |
| JP | 2004-211650 | * | 7/2004 |
| WO | WO 03/100227 A1 | * | 12/2003 |

* cited by examiner

EXHAUST GAS CLEANING APPARATUS

TECHNICAL FIELD

The present invention relates to an exhaust gas cleaning apparatus.

BACKGROUND ART

To suppress the atmospheric diffusion of particles contained in the exhaust gas of diesel engines, in recent years, various apparatuses are being developed for mounting in the exhaust system of diesel engines for after-treatment of diesel particulates in the exhaust gas. There is an exhaust gas treatment apparatus of this type that is in the course of becoming of practical utility, having a configuration that includes a filter for trapping particulates contained in exhaust gas discharged from the diesel engine when the exhaust gas passes through the exhaust path. With this type of exhaust gas cleaning apparatus, particulates trapped by the filter gradually accumulate, loss caused by elevation of exhaust resistance gradually increases, and ultimately the filter becomes clogged. When the quantity of the accumulated particulates in the filter used in the exhaust gas cleaning apparatus reaches a prescribed level, the filter is heated to burn the accumulated particulates and regenerate the filter, and the filter is re-used.

Hereupon, burning particulates to regenerate the filter leaves a residue of ash in the filter, and since the residual ash accumulates with each filter regeneration, as the number of regenerations builds up, the residual ash in the filter obstructs the outflow of the exhaust gas. Since before, therefore, the before and after differential pressure which is the differential pressure between the filter inlet pressure and outlet pressure, is measured at the completion of each filter regeneration, and the measured before and after differential pressure value of the filter is used as a basis to estimate the quantity of residual ash in the filter, and the filter life is determined in accordance with the result of the estimation.

However, with a configuration in which the residual ash quantity is estimated by measuring the before and after differential pressure of the filter, in cases where, after starting the filter regeneration process, for some reason or other the regeneration process is interrupted, leaving unburned particulates in the filter, even if the before and after differential pressure of the filter is measured after the completion of the regeneration process, residual ash quantity cannot be measured accurately due to the unburned particulates. This being the case, it frequently has been impossible to determine correctly the time to replace the filter.

An object of the present invention is to provide an exhaust gas cleaning apparatus that is able to resolve the above-described problems of the conventional technology.

An object of the present invention is to provide an exhaust gas cleaning apparatus that makes it possible to accurately ascertain the quantity of ash remaining in a filter.

An object of the present invention is to provide an exhaust gas cleaning apparatus that makes it possible to replace filters at a suitable timing.

DISCLOSURE OF THE INVENTION

The present invention is characterized in that, in an exhaust gas cleaning apparatus that includes a filter for trapping particulates contained in exhaust gas of an internal combustion engine and differential pressure detection means that detects a before and after differential pressure of the filter, configured to control regeneration of the filter based on the before and after differential pressure, it includes temperature differential detection means for detection of a temperature differential between the filter inlet end and outlet end, determination means for determining regeneration completion timing of the filter in response to the temperature differential detection means, and estimation means for estimating the quantity of residual ash in the filter based on an output of the differential pressure detection means in response to the determination of the regeneration completion timing of the filter by the determination means.

The before and after differential pressure of the filter is measured and the quantity of residual ash is estimated after the timing at which the regeneration of the filter has been completed has been determined based on the before and after temperature differential of the filter, enabling accurate estimation of residual ash quantity without including unburned particulates, making it possible to determine correctly the time to replace the filter.

BEST MODE OF CARRYING OUT THE INVENTION

In order to explain the present invention in greater detail, it will now be described with reference to the attached drawings.

Figure 1:
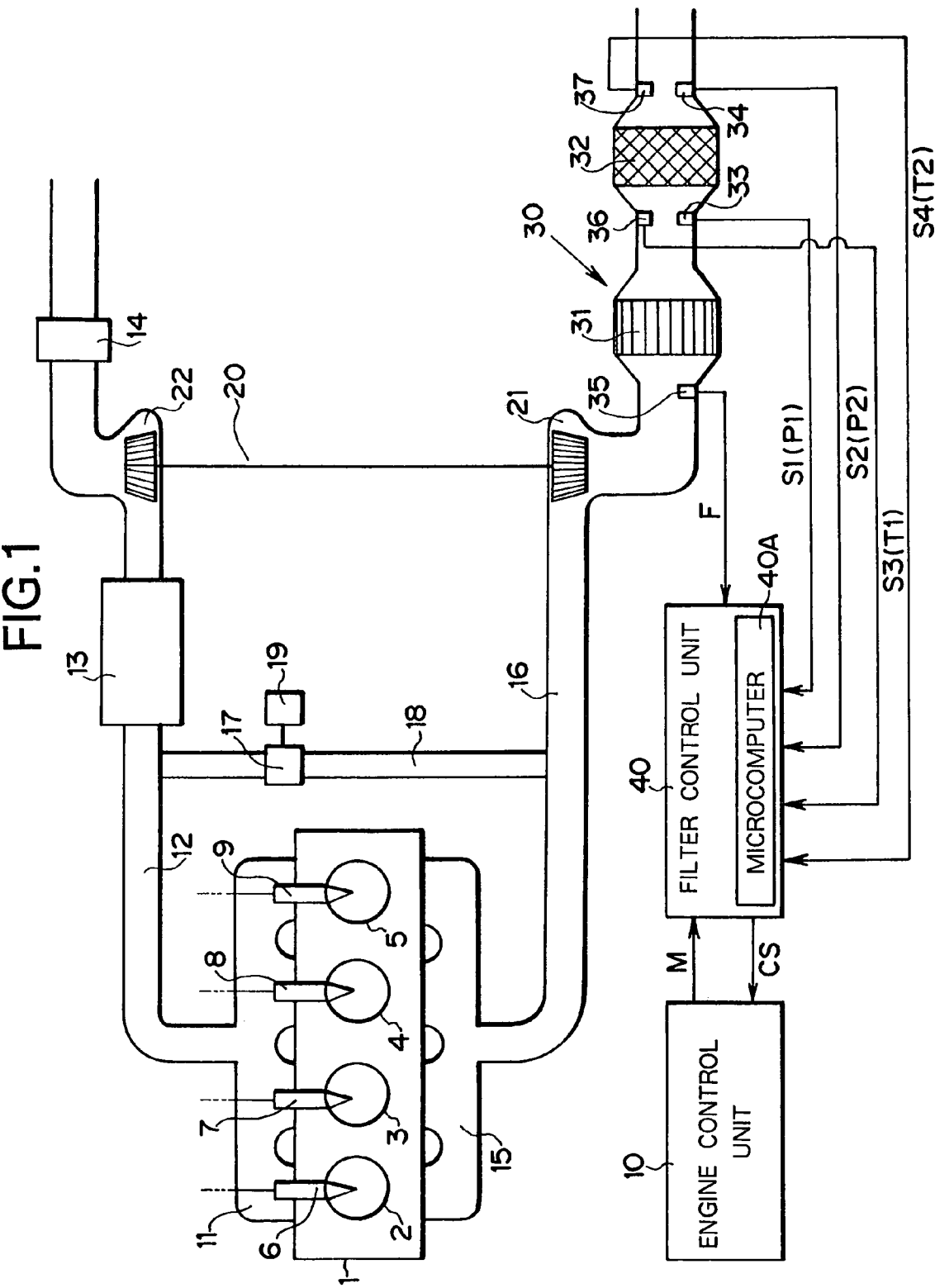
FIG. 1 is a schematic diagram showing an example of an embodiment of the exhaust gas cleaning apparatus of the present invention applied to a diesel engine.

FIG. 1 is an overall schematic diagram showing an example of an embodiment of the exhaust gas cleaning apparatus of the present invention applied to a diesel engine. Symbol 1 denotes a four-cylinder diesel engine, the cylinders 2-5 of which are provided with injectors 6-9, respectively. The operation of these injectors 6-9 is controlled by engine control unit 10, using a known arrangement to inject a required amount of high-pressure fuel, at a required timing, into the corresponding cylinder.

An intake duct 12 connected to an intake manifold 11 is provided with an inter-cooler 13 and an air cleaner 14. An exhaust duct 16 connected to an exhaust manifold 15 is provided with an exhaust gas cleaning apparatus 30.

An exhaust recirculation channel 18 provided with an EGR control valve 17 is provided between the intake duct 12 and the exhaust duct 16. The opening of the EGR control valve 17 is regulated by an actuator 19 controlled by the engine control unit 10. This forms an arrangement whereby part of the exhaust gas flowing in the exhaust duct 16 can be metered and returned to the intake manifold 11. Symbol 20 denotes an exhaust turbocharger, comprised of an exhaust turbine 21 disposed inside the exhaust duct 16 and a compressor 22 that is disposed inside the intake duct 12 and driven by the exhaust turbine 21.

The exhaust gas cleaning apparatus 30 includes an oxidation catalyst 31 and a filter 32 for trapping particulates, and is arranged so that exhaust gas flowing in the exhaust duct 16 flows first to the oxidation catalyst 31, and then flows to the filter 32. The oxidation catalyst 31 is configured by forming a washcoat layer of activated alumina on the surface of a support constituted of, for example, honeycomb-structure cordierite or heat-resistant steel, and suitable catalyst activated components are then imparted to the washcoat layer. The oxidation catalyst is configured to oxidize NO in the exhaust gas to produce $NO_2$, and to also oxidize HC and CO in the exhaust gas to produce O and $CO_2$.

The filter 32 is formed of, for example, porous cordierite or multiple cells of silicon carbide formed in parallel with cells with sealed inlets alternating with cells with sealed outlets, a so-called wallflow type honeycomb, or a fiber type filter comprising layers of ceramic fibers wrapped around a perforated stainless-steel tube, that traps particulates in the exhaust gas.

The inlet end (before) and outlet end (after) of the filter 32 are provided with first and second pressure sensors 33 and 34, respectively, for detecting each exhaust gas pressure. A first pressure signal S1 indicating the exhaust gas pressure P1 at the inlet end of the filter 32 is output from the first pressure sensor 33, and a second pressure signal S2 indicating the exhaust gas pressure P2 at the outlet end of the filter 32 is output from the second pressure sensor 34.

In addition, the inlet end (before) and outlet end (after) of the filter 32 are provided with first and second temperature sensors 36 and 37, respectively, for detecting each exhaust gas temperature. A first temperature signal S3 indicating the temperature T1 at the inlet end of the filter 32 is output from the first temperature sensor 36, and a second temperature signal S4 indicating the temperature T2 at the outlet end of the filter 32 is output from the second temperature sensor 37.

Symbol 35 denotes a flow rate sensor for detecting the flow rate of the exhaust gas flowing in the exhaust duct 16. An exhaust gas flow rate signal F from the flow rate sensor 35 is input to filter control unit 40, together with the first pressure signal S1, second pressure signal S2, first temperature signal S3 and second temperature signal S4.

The filter control unit 40 is a constituent element of the exhaust gas cleaning apparatus 30. The filter control unit 40 is constituted as a computer control system using a microcomputer 40A. In the filter control unit 40, the quantity of accumulated particulates trapped by the filter 32 is estimated, and based on the estimation result, filter control is carried out for regenerating the filter 32. The filter control unit 40 is also configured to estimate the quantity of residual ash in the filter 32 when the regeneration of the filter 32 is completed and, based on the ash residual quantity estimation result, carry out processing to prompt for the replacement of the filter 32.

Figure 2:
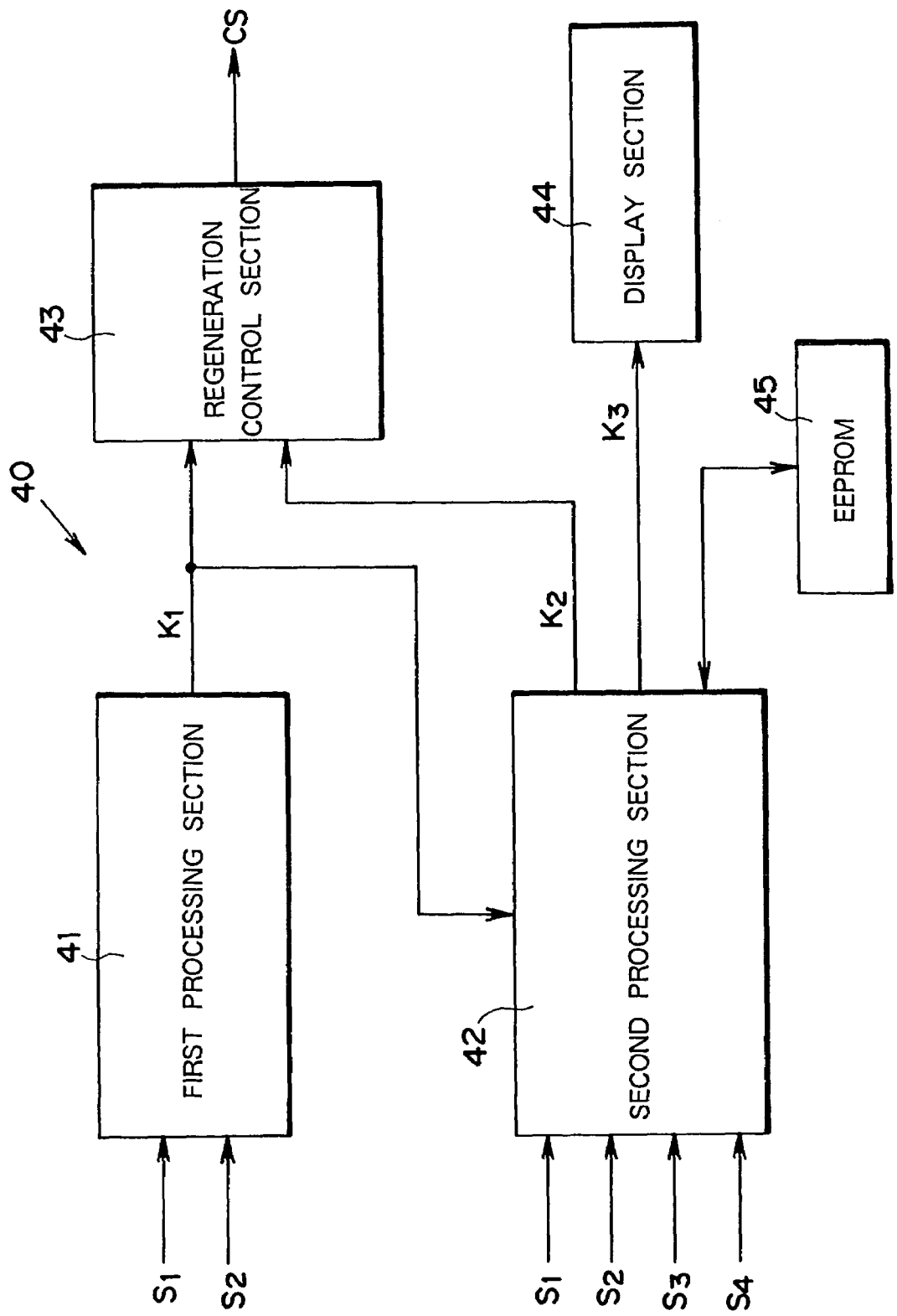
FIG. 2 is a block diagram showing the configuration of the filter control unit shown in FIG. 1.

FIG. 2 is a block diagram showing the functional composition of the filter control unit 40. The filter control unit 40 has a first processing section 41 that estimates the quantity of accumulated particulates trapped by the filter 32 and determines whether or not the filter regeneration process should be carried out, and a second processing section 42 that, after confirming whether or not regeneration of the filter 32 has been completed, estimates the quantity of residual ash that has accumulated in the filter 32 and determines the timing for replacing the filter 32.

At the first processing section 41, the before and after differential pressure $\Delta P$ ($=P1-P2$) of the filter 32 is calculated in response to the first pressure signal S1 and the second pressure signal S2, and the quantity of accumulated particulates in the filter 32 is estimated based on the value of the before and after differential pressure $\Delta P$ thus obtained. In accordance with this estimation result, it is determined whether or not the filter 32 should be regenerated. When the first processing section 41 determines that the filter 32 should be regenerated, a regeneration initiation signal K1 is output from the first processing section 41 and sent to the second processing section 42 and a regeneration control section 43.

First pressure signal S1, second pressure signal S2, first temperature signal S3 and second temperature signal S4 are input to the second processing section 42, where determination of the timing of the completion of the processing operation for regenerating the filter 32 is made, and arithmetic processing is carried out for estimating the quantity of residual ash in the filter 32 from the before and after differential pressure $\Delta P$ of the filter 32 when the processing operation for regenerating the filter 32 has been completed. In response to the determination by the second processing section 42 of the timing at which the regeneration of the filter 32 has been completed, a regeneration completion signal K2 is output and sent to the regeneration control section 43. When the second processing section 42 determines that the estimated value of the residual ash quantity has reached a prescribed level, a replacement warning signal K3 urging replacement of the filter is output from the second processing section 42 and sent to a display section 44, which displays a prescribed message, in a suitable format, prompting the operator to replace the filter.

In response to the regeneration initiation signal K1, the regeneration control section 43 outputs to the engine control unit 10 a regeneration control signal CS as a signal for controlling engine operation to elevate the exhaust gas temperature for regeneration of the filter 32.

In response to the regeneration control signal CS from the regeneration control section 43, the engine control unit 10 applies a large delay to the fuel injection timing so that fuel injection takes place after compression top dead center of each cylinder, to thereby elevate the exhaust gas temperature to the temperature required for burning particulates. When the regeneration completion signal K2 is input to the regeneration control section 43, output of the regeneration control signal CS stops, and the engine control unit 10 stops controlling the engine to control the filter regeneration, and reverts to normal driving control operations.

Symbol 45 denotes an EEPROM for storing required data from among the obtained data in the second processing section 42.

Figure 3:
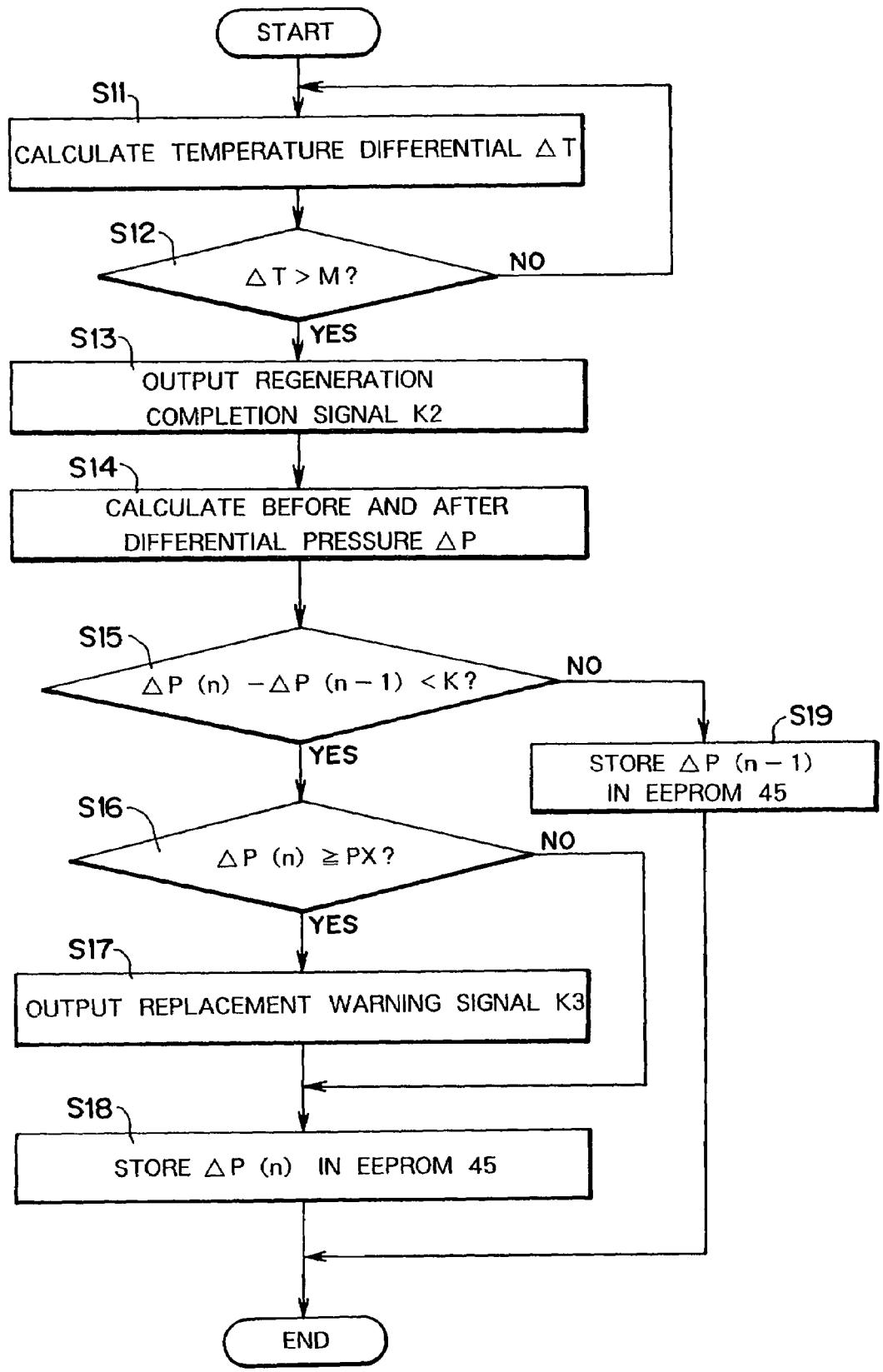
FIG. 3 is a flow chart of a program for executing the arithmetic processing in the second processing section.

Next, a detailed description will be made concerning the second processing section 42, with reference to FIG. 3. FIG. 3 is a flow chart showing the arithmetic processing program for executing the required arithmetic processing in the second processing section 42. The arithmetic processing program is executed in the microcomputer 40A, where it is initiated in response to the input of the regeneration initiation signal K1. First, in step S11, the first temperature signal S3 indicating the filter before (inlet) temperature T1 of the filter 32 and the second temperature signal S4 indicating the filter after (outlet) temperature T2 of the filter 32 are used as a basis for calculating the temperature differential $\Delta T$ ($=T1-T2$) at the inlet and outlet ends of the filter 32, and the process enters step S12.

When regeneration control signal CS has been output in response to regeneration initiation signal K1, thereby the exhaust gas temperature has been elevated to burn accumulated particulates in the filter 32 and the burning of the particulates has been fully completed, a fact that the temperature of the exhaust gas decreases slightly when it passes through the filter is used in step S12 to determine whether or not the burning of the particulates has been fully completed. In step S12, it is determined whether or not the temperature differential ΔT (=T1−T2) calculated in step S11 is greater than a prescribed value M. If the burning of the particulates has not been fully completed, the temperature differential ΔT will be smaller than M, and the determination result of step S12 will be NO, and the process will return to step S11. Execution of steps S11 and S12 is repeated until temperature differential ΔT becomes greater than M. When temperature differential ΔT becomes greater than M, it is determined that burning of the particulates has been completed and the determination result of step S12 becomes YES, and the process enters step S13. The value of M can be suitably set based on experiments and the like.

In step S13, the process for outputting the regeneration completion signal K2 for ending regeneration of the filter 32 is carried out. In the next step S14, in order to estimate the quantity of residual ash that has accumulated in the filter 32 based on the before and after differential pressure of the filter 32 (the pressure differential between the inlet and outlet ends of the filter 32), the before and after differential pressure ΔP (=P1−P2) of the filter 32 at that time is calculated based on the first pressure signal S1 and second pressure signal S2. The before and after differential pressure ΔP value obtained each time regeneration of the filter 32 is completed in order to estimate the residual ash quantity, is stored in the EEPROM 45.

Next, in step S15, the before and after differential pressure ΔP (n) calculated this time for estimating the residual ash quantity is compared with the before and after differential pressure ΔP (n−1) calculated the previous time for estimating the residual ash quantity to determine whether or not the difference value ΔP (n)−ΔP (n−1) is smaller than a predetermined value K. Value K shows the upper limit value of the increase in residual ash quantity produced by one regeneration. If ΔP (n)−ΔP (n−1)<K, the increase in the residual ash quantity produced by the regeneration this time is not more than K and ΔP (n) is a proper value, so the determination result of step S15 is YES, and the process enters step S16. In step S16, it is determined whether or not the before and after differential pressure ΔP (n) is not less than a prescribed differential pressure threshold value PX. Differential pressure threshold value PX shows the level of the before and after differential pressure ΔP at which the residual ash quantity accumulated in the filter 32 necessitates replacement of the filter. If ΔP (n)≧PX, the determination result in step S16 is YES, and the process enters step S17, where a replacement warning signal K3 urging filter replacement is output.

In the next step S18, the before and after differential pressure ΔP (n) for this time, obtained in step S14, is stored in the EEPROM 45, and execution of the program terminates. If in step S16 ΔP (n)<PX, the residual ash quantity accumulating in the filter 32 is below the level necessitating replacement of the filter, so the determination result in step S16 is NO, the process enters step S18 without executing step S17, the before and after differential pressure ΔP (n) for this time obtained in step S14 is stored in the EEPROM 45, and execution of the program terminates.

In step S15, if ΔP (n)−ΔP (n−1)≧K, the increase in the residual ash quantity produced by the regeneration this time is more than K, and it is determined that there is a problem with the reliability of the ΔP (n) obtained this time, so the determination result in step S15 is NO, and the process enters step S19. That is, if in step S15 it is determined that −ΔP (n)−ΔP (n−1)≧K, there is a high possibility that unburned particulates remain in the filter 32, in which case it could be considered that the before and after differential pressure of the filter 32 is due to the residual ash and unburned particulates. It is therefore determined that the residual ash quantity cannot be estimated accurately on the basis of this differential pressure ΔP (n), the previous before and after differential pressure ΔP (n−1) is stored in the EEPROM 45 and execution of the program terminates.

Figure 4:
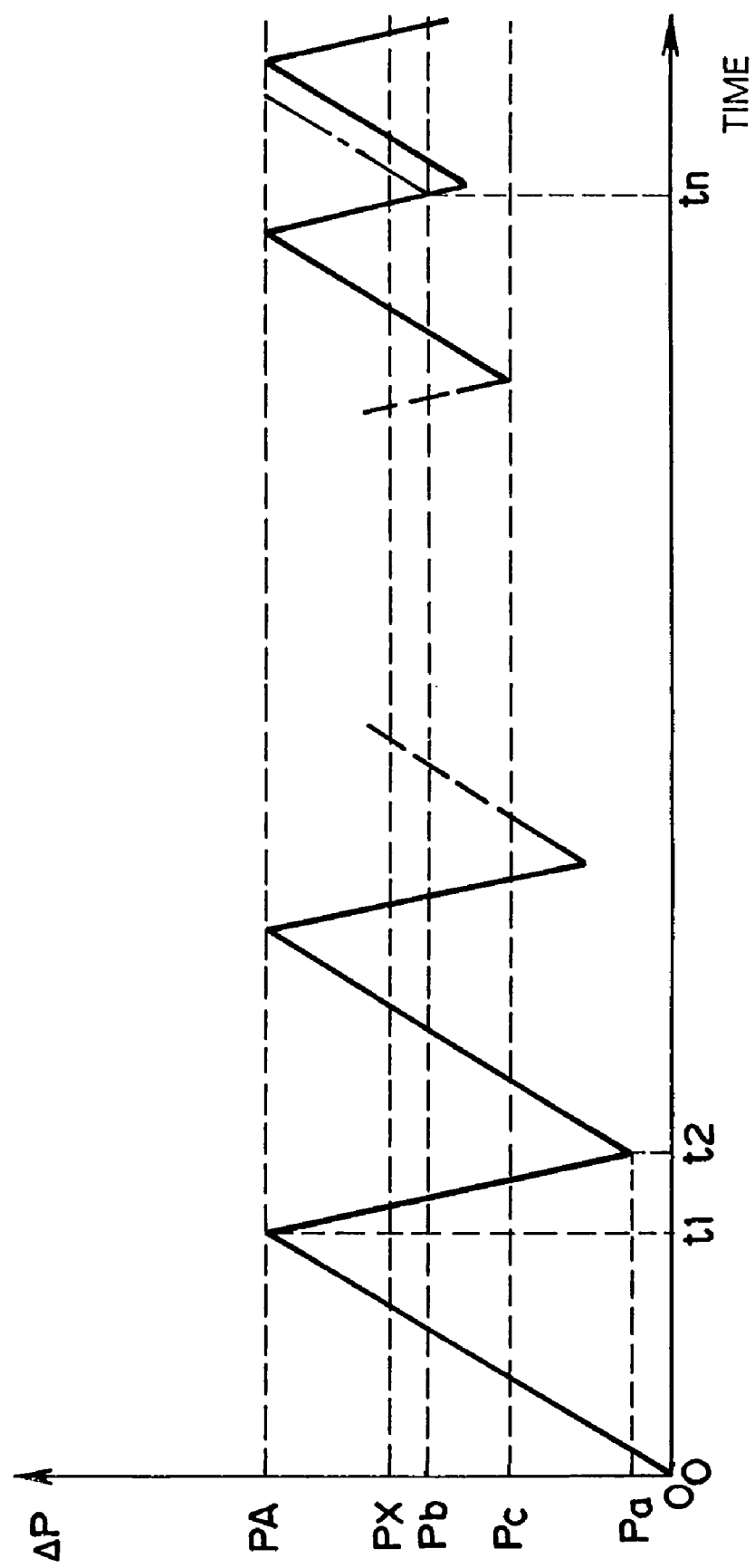
FIG. 4 is a graph for explaining the operation of the filter control unit.

The operation of the filter control unit 40 having the above-described configuration will now be described with reference to FIG. 4. FIG. 4 is a graph showing time-based changes in the before and after differential pressure ΔP of the filter 32, with the horizontal axis representing time t and the vertical axis the differential pressure ΔP.

This shows the case starting off using a new filter that has been installed, with the before and after differential pressure ΔP being zero at time t=0. With the passage of time, particulates accumulate on the filter 32 and the before and after differential pressure of the filter 32 rises. When at time $t_1$ it is determined in the first processing section 41 that the before and after differential pressure ΔP has reached the prescribed value PA, a regeneration initiation signal K1 is output from the first processing section 41. In response to the regeneration initiation signal K1, a regeneration control signal CS is output from the regeneration control section 43, and the process of regenerating the filter 32 starts. Thus, particulates are burned, decreasing the before and after differential pressure of the filter 32. When at time $t_2$ the before and after temperature differential ΔT of the filter 32 has exceeded M and it is determined in the second processing section 44 that regeneration of the filter 32 has been completed, a regeneration completion signal K2 is output from the second processing section 44 to the regeneration control section 43, terminating the filter 32 regeneration process. At this time, the before and after differential pressure ΔP is a value Pa (>0) corresponding to the residual ash quantity. It is determined whether or not this value Pa is smaller than the prescribed value K. If Pa is smaller than K, it is determined that there is nothing more to burn, so the residual ash quantity in the filter 32 is taken to correspond to the value Pa.

Following the completion of the regeneration process, the trapping of particulates by the filter 32 is initiated from the state of before and after differential pressure ΔP=Pa. As the filter control unit 40 repeats the above-described operations, the before and after differential pressure ΔP of the filter 32 changes as shown by the solid line. If the before and after differential pressure ΔP becomes ΔP≧PX even after regeneration processing of the filter 32, a replacement warning signal K3 is output from the second processing section 42, urging that the filter 32 be replaced.

If at time $t_n$, when the nth regeneration process has been completed, the before and after differential pressure ΔP=Pb is compared with the before and after differential pressure ΔP=Pc at the time of completion of the preceding (n−1th) regeneration process and the difference value Pb−Pc (=ΔP (n)−ΔP (n−1)) is K or greater, it is determined that unburned particulates remain in the filter 32, in which case the before and after differential pressure ΔP (n−1)=Pc at the time of the completion of the n−1th regeneration process is stored in the EEPROM 45. When trapping is then resumed by the filter 32, as shown by the dashed line, the value of the before and after differential pressure ΔP increases from the value Pb with the passage of time.

In this way, the residual ash quantity that has accumulated in the filter is estimated after it has been determined, based on the before and after filter temperature differential, that filter regeneration has been completed, enabling accurate estimation of residual ash quantity without including unburned particulates, making it possible to determine correctly the time to replace the filter.

Also, the filter before and after differential pressure at the time the filter regeneration is completed is used as a reference value for determining the timing of the start of the next filter regeneration, thereby making it possible to estimate with more precision the quantity of particulates that have accumulated in the filter, and as a result, it is also possible to correctly determine the timing of the filter regeneration initiation.

Moreover, as feedback for engine control, the residual ash quantity can be used to correct fuel injection amounts and control intake quantity and pressure.

INDUSTRIAL APPLICABILITY

As set out in the foregoing, the exhaust gas cleaning apparatus according to the present invention is useful for suitably determining the timing of filter replacement.

The invention claimed is:

1. An exhaust gas cleaning apparatus comprising:
   a filter for trapping particulates contained in exhaust gas of an internal combustion engine;
   a differential pressure detection means that detects a differential pressure between a filter inlet end and a filter outlet end, said differential pressure detection means being configured to control regeneration of the filter in response to the differential pressure between the filter inlet end and the filter outlet end;
   differential detection means for detection of a temperature differential between the filter inlet end and the filter outlet end;
   determination means for determining regeneration completion timing of the filter in response to the temperature differential detection means; and
   estimation means for estimating the quantity of residual ash in the filter based on an output of the differential pressure detection means in response to the determination of the regeneration completion timing of the filter by the determination means, wherein the determination means includes means of determining whether or not regeneration of the filter has been completed by comparing the temperature differential with a prescribed non-zero value.

2. An exhaust gas cleaning apparatus as claimed in claim 1, wherein estimation of the quantity of residual ash by the estimation means is estimation of whether or not the quantity of residual ash in the filter has reached a value necessitating replacement of the filter.

3. An exhaust gas cleaning apparatus as claimed in claim 2, wherein in a case in which an amount of change of a value of the differential pressure between the filter inlet end and outlet end obtained from the differential pressure detection means is greater than a predetermined value, the estimation means does not estimate a residual ash quantity.

4. An exhaust gas cleaning apparatus as claimed in claim 3, wherein in a case in which the amount of change is greater than the predetermined value, the differential pressure between the filter inlet end and outlet end that contributes to making the amount of change greater than the predetermined value is not employed as data for subsequent estimation of residual ash quantity.

5. An exhaust gas cleaning apparatus as claimed in claim 2, wherein in a case in which residual ash quantity in the filter is estimated by the estimation means to have reached a value necessitating replacement of the filter, a display urges filter replacement.

6. An exhaust gas cleaning apparatus as claimed in claim 3, wherein in a case in which residual ash quantity in the filter is estimated by the estimation means to have reached a value necessitating replacement of the filter, a display urges filter replacement.

7. An exhaust gas cleaning apparatus as claimed in claim 4, wherein in a case in which residual ash quantity in the filter is estimated by the estimation means to have reached a value necessitating replacement of the filter, a display urges filter replacement.

* * * * *